(12) United States Patent
Paul et al.

(10) Patent No.: US 9,387,442 B2
(45) Date of Patent: Jul. 12, 2016

(54) COMPOSITE POLYAMIDE MEMBRANE DERIVED FROM AN ALIPHATIC ACYCLIC TERTIARY AMINE COMPOUND

(71) Applicant: Dow Global Technologies LLC, Midland, MI (US)

(72) Inventors: Mou Paul, Edina, MN (US); William E. Mickols, Bartlesville, OK (US)

(73) Assignee: Dow Global Technologies LLC

( * ) Notice: Subject to any disclaimer, the term of this patent is extended or adjusted under 35 U.S.C. 154(b) by 0 days.

(21) Appl. No.: 14/771,713

(22) PCT Filed: Apr. 15, 2014

(86) PCT No.: PCT/US2014/034062
§ 371 (c)(1),
(2) Date: Aug. 31, 2015

(87) PCT Pub. No.: WO2014/179024
PCT Pub. Date: Nov. 6, 2014

(65) Prior Publication Data
US 2016/0045873 A1  Feb. 18, 2016

Related U.S. Application Data

(60) Provisional application No. 61/818,934, filed on May 3, 2013.

(51) Int. Cl.
*B01D 71/56* (2006.01)
*B01D 67/00* (2006.01)
*B01D 69/12* (2006.01)

(52) U.S. Cl.
CPC ........ *B01D 67/0006* (2013.01); *B01D 67/0088* (2013.01); *B01D 69/12* (2013.01); *B01D 69/125* (2013.01); *B01D 71/56* (2013.01); *B01D 2323/40* (2013.01)

(58) Field of Classification Search
CPC ....................................................... B01D 71/56
See application file for complete search history.

(56) References Cited

U.S. PATENT DOCUMENTS

| | | | |
|---|---|---|---|
| 3,304,310 A | 2/1967 | Hari et al. | |
| 3,686,116 A | 8/1972 | Rio | |
| 3,694,390 A | 9/1972 | Winslow | |
| 3,878,109 A | 4/1975 | Ikeda et al. | |
| 4,259,183 A | 3/1981 | Cadotte | |
| 4,277,344 A | 7/1981 | Cadotte | |
| 4,529,646 A | 7/1985 | Sundet | |
| 4,606,943 A | 8/1986 | Rak et al. | |
| 4,626,468 A | 12/1986 | Sundet | |
| 4,643,829 A | 2/1987 | Sundet | |
| 4,719,062 A | 1/1988 | Sundet | |
| 4,758,343 A | 7/1988 | Sasaki et al. | |
| 4,761,234 A | 8/1988 | Uemura et al. | |
| 4,769,148 A | 9/1988 | Fibiger et al. | |
| 4,783,346 A | 11/1988 | Sundet | |
| 4,812,270 A | 3/1989 | Cadotte et al. | |
| 4,830,885 A | 5/1989 | Tran et al. | |
| 4,872,984 A | 10/1989 | Tomaschke | |
| 4,888,116 A | 12/1989 | Cadotte et al. | |
| 4,948,507 A | 8/1990 | Tomaschke | |
| 4,950,404 A | 8/1990 | Chau | |
| 4,960,517 A | 10/1990 | Cadotte | |
| 5,015,380 A | 5/1991 | Sundet | |
| 5,015,382 A | 5/1991 | Sundet | |
| 5,019,264 A | 5/1991 | Arthur | |
| 5,049,282 A | 9/1991 | Linder et al. | |
| 5,051,178 A | 9/1991 | Uemura et al. | |
| 5,160,619 A | 11/1992 | Yamaguchi et al. | |
| 5,180,802 A | 1/1993 | Hartman et al. | |
| 5,246,587 A | 9/1993 | Tomaschke | |
| 5,254,261 A | 10/1993 | Tomaschke et al. | |
| 5,290,452 A | 3/1994 | Schucker | |
| 5,336,409 A | 8/1994 | Hachisuka et al. | |
| 5,510,527 A | 4/1996 | Hachisuka et al. | |
| 5,576,057 A | 11/1996 | Hirose et al. | |
| 5,582,725 A | 12/1996 | McCray et al. | |
| 5,593,588 A | 1/1997 | Kim et al. | |
| 5,614,099 A | 3/1997 | Hirose et al. | |
| 5,616,249 A | 4/1997 | Hodgdon | |
| 5,693,227 A | 12/1997 | Costa | |
| 5,733,602 A | 3/1998 | Hirose et al. | |

(Continued)

FOREIGN PATENT DOCUMENTS

| | | |
|---|---|---|
| CN | 1035338 | 9/1989 |
| CN | 1935338 | 3/2007 |
| CN | 102219673 | 10/2011 |
| EP | 556569 | 11/1993 |
| JP | 53146275 | 12/1978 |
| WO | 2010120326 | 10/2010 |
| WO | 2011152735 | 12/2011 |
| WO | 2013048762 | 4/2013 |
| WO | 2013048763 | 4/2013 |
| WO | 2013048765 | 4/2013 |

(Continued)

OTHER PUBLICATIONS

Li et al, Polyamide thin fim composite membranes prepared from isomeric biphenyl tetraacyl chloride and m-phenylenediamine, Jornal of Membrane Science 315, (2008)20-27.

Petersen, Composite reverse osmosis and nanofiltration membranes, Journal of Membrane Science 83, (1993) 81-150.

*Primary Examiner* — Alex A Rolland

(57) ABSTRACT

A method for making a composite polyamide membrane comprising a porous support and a thin film polyamide layer, wherein the method comprises the step of applying a polar solution including a polyfunctional amine monomer and nonpolar solution including a polyfunctional acyl halide monomer to a surface of the porous support and interfacially polymerizing the monomers to form a thin film polyamide layer, wherein the method is characterized by the step of applying a non-polar solution comprising an aliphatic acyclic tertiary amine compound to the support.

9 Claims, No Drawings

(56) References Cited

U.S. PATENT DOCUMENTS

| | | | |
|---|---|---|---|
| 5,744,039 | A | 4/1998 | Itoh et al. |
| 5,755,964 | A | 5/1998 | Mickols |
| 5,783,079 | A | 7/1998 | Kumano et al. |
| 5,843,351 | A | 12/1998 | Hirose et al. |
| 5,876,602 | A | 3/1999 | Jons et al. |
| 5,989,426 | A | 11/1999 | Hirose et al. |
| 6,024,873 | A | 2/2000 | Hirose et al. |
| 6,086,764 | A | 7/2000 | Linder et al. |
| 6,162,358 | A | 12/2000 | Li et al. |
| 6,245,234 | B1 * | 6/2001 | Koo ............... B01D 69/125 210/490 |
| 6,280,853 | B1 | 8/2001 | Mickols |
| 6,337,018 | B1 | 1/2002 | Mickols |
| 6,406,626 | B1 | 6/2002 | Murakami et al. |
| 6,464,873 | B1 | 10/2002 | Tomaschke |
| 6,521,130 | B1 | 2/2003 | Kono et al. |
| 6,562,266 | B2 | 5/2003 | Mickols |
| 6,723,241 | B2 | 4/2004 | Mickols |
| 6,723,422 | B1 | 4/2004 | Hirose et al. |
| 6,777,488 | B1 | 8/2004 | Araki et al. |
| 6,878,278 | B2 | 4/2005 | Mickols |
| 7,279,097 | B2 | 10/2007 | Tomioka et al. |
| 7,806,275 | B2 | 10/2010 | Murphy et al. |
| 7,815,987 | B2 | 10/2010 | Mickols et al. |
| 7,882,963 | B2 | 2/2011 | Mickols et al. |
| 7,905,361 | B2 | 3/2011 | Niu et al. |
| 7,918,349 | B2 | 4/2011 | Mickols et al. |
| 8,147,735 | B2 | 4/2012 | Buschmann |
| 8,177,978 | B2 | 5/2012 | Kurth et al. |
| 8,721,942 | B2 | 5/2014 | Mickols et al. |
| 8,968,828 | B2 | 3/2015 | Roy et al. |
| 8,999,449 | B2 | 4/2015 | Paul et al. |
| 9,051,227 | B2 | 6/2015 | Roy et al. |
| 9,073,015 | B2 | 7/2015 | Rosenberg et al. |
| 2010/0181250 | A1 | 7/2010 | Kim et al. |
| 2011/0049055 | A1 | 3/2011 | Wang et al. |
| 2012/0080058 | A1 | 4/2012 | Isaias et al. |
| 2012/0248027 | A1 | 10/2012 | Sasaki et al. |
| 2012/0261332 | A1 | 10/2012 | Takagi et al. |
| 2012/0305473 | A1 | 12/2012 | Ogawa et al. |
| 2013/0089727 | A1 | 4/2013 | Nilsen et al. |
| 2013/0126419 | A1 | 5/2013 | Ogawa et al. |
| 2013/0256215 | A1 | 10/2013 | Nakatsuji et al. |
| 2013/0287944 | A1 | 10/2013 | Paul et al. |
| 2013/0287946 | A1 | 10/2013 | Jons et al. |
| 2014/0170314 | A1 | 6/2014 | Zhang et al. |
| 2014/0199483 | A1 | 7/2014 | Roy et al. |
| 2014/0206900 | A1 | 7/2014 | Qiu et al. |
| 2014/0231338 | A1 | 8/2014 | Takaya et al. |
| 2014/0264162 | A1 | 9/2014 | Qiu et al. |
| 2014/0272134 | A1 | 9/2014 | Roy et al. |
| 2015/0129485 | A1 | 5/2015 | Roy et al. |
| 2015/0147470 | A1 | 5/2015 | Arrowood et al. |
| 2015/0151255 | A1 | 6/2015 | Roy et al. |
| 2015/0157990 | A1 | 6/2015 | Roy et al. |
| 2015/0165387 | A1 | 6/2015 | Roy et al. |
| 2015/0174534 | A1 | 6/2015 | Paul et al. |

FOREIGN PATENT DOCUMENTS

| | | |
|---|---|---|
| WO | 2014109946 | 7/2014 |
| WO | 2014109947 | 7/2014 |
| WO | 2014179024 | 11/2014 |
| WO | 2015105630 | 7/2015 |
| WO | 2015105631 | 7/2015 |
| WO | 2015105632 | 7/2015 |
| WO | 2015105636 | 7/2015 |
| WO | 2015105637 | 7/2015 |
| WO | 2015105638 | 7/2015 |
| WO | 2015105639 | 7/2015 |

* cited by examiner

COMPOSITE POLYAMIDE MEMBRANE DERIVED FROM AN ALIPHATIC ACYCLIC TERTIARY AMINE COMPOUND

FIELD OF THE INVENTION

The present invention is directed toward composite membranes along with methods for making and using the same.

DESCRIPTION OF THE RELATED ART

Composite polyamide membranes are used in a variety of fluid separations. One common class of membranes includes a porous support coated with a "thin film" polyamide layer. The thin film layer may be formed by an interfacial polycondensation reaction between polyfunctional amine (e.g. m-phenylenediamine) and polyfunctional acyl halide (e.g. trimesoyl chloride) monomers which are sequentially coated upon the support from immiscible solutions, see for example U.S. Pat. No. 4,277,344 to Cadotte. Various constituents may be added to one or both of the coating solutions to improve membrane performance. For example, U.S. Pat. No. 6,878,278 to Mickols describes the addition of a wide range of complexing agents to the acyl halide coating solution, including various phosphorous containing species. U.S. Pat. No. 4,769,148 and U.S. Pat. No. 5,246,587 describe the addition of polymeric wetting agents acid acceptors and water soluble salts of tertiary amines to the polar coating solution. See also US 2009/0107922. Similarly, the nascent thin film membrane may be post-treated to improve performance. For example, U.S. Pat. No. 5,755,964 to Mickols describes post-treatment with ammonia or selected amines, e.g. butylamine, cyclohexylamine and 1,6 hexane diamine. Similarly, U.S. Pat. No. 7,882,963 to Mickols describes the use of post coating solutions including various primary, secondary and aromatic amines. The search continues for new additives and treatments that offer improved membrane performance.

BRIEF SUMMARY OF THE INVENTION

The invention includes a method for making a composite polyamide membrane comprising a porous support and a thin film polyamide layer, wherein the method comprises the step of applying a polar solution including a polyfunctional amine monomer and non-polar solution including a polyfunctional acyl halide monomer to a surface of the porous support and interfacially polymerizing the monomers to form a thin film polyamide layer, wherein the method is characterized by the step of applying a non-polar solution comprising an aliphatic, acyclic, tertiary amine compound to the support. The invention includes many embodiments.

DETAILED DESCRIPTION OF THE INVENTION:

The invention is not particularly limited to a specific type, construction or shape of composite membrane or application. For example, the present invention is applicable to flat sheet, tubular and hollow fiber polyamide membranes useful in a variety of applications including forward osmosis (FO), reverse osmosis (RO), nano filtration (NF), ultra filtration (UF) and micro filtration (MF) fluid separations. However, the invention is particularly useful for membranes designed for RO and NF separations. RO composite membranes are relatively impermeable to virtually all dissolved salts and typically reject more than about 95% of salts having monovalent ions such as sodium chloride. RO composite membranes also typically reject more than about 95% of inorganic molecules as well as organic molecules with molecular weights greater than approximately 100 Daltons. NF composite membranes are more permeable than RO composite membranes and typically reject less than about 95% of salts having monovalent ions while rejecting more than about 50% (and often more than 90%) of salts having divalent ions—depending upon the species of divalent ion. NF composite membranes also typically reject particles in the nanometer range as well as organic molecules having molecular weights greater than approximately 200 to 500 Daltons.

In one embodiment, the composite membranes comprises a flat sheet including a bottom layer (back side) of a nonwoven backing web (e.g. PET scrim), a middle layer of a porous support having a typical thickness of about 25-125 μm and top layer (front side) comprising a thin film polyamide layer having a thickness preferably less than about 1 micron, e.g. from 0.01 micron to 1 micron but more preferably from about 0.01 to 0.1 μm. The porous support may be a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 μm. Non-limiting examples of porous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. For RO and NF applications, the porous support provides strength but offers little resistance to fluid flow due to its relatively high porosity.

Due to its relative thinness, the polyamide layer is often described in terms of its coating coverage or loading upon the porous support, e.g. from about 2 to 5000 mg of polyamide per square meter surface area of porous support and more preferably from about 50 to 500 mg/m$^2$. The polyamide layer is preferably prepared by an interfacial polycondensation reaction between a polyfunctional amine monomer and a polyfunctional acyl halide monomer upon the surface of the porous support as described in U.S. Pat. No. 4,277,344 and U.S. Pat. No. 6,878,278. More specifically, the polyamide membrane layer may be prepared by interfacially polymerizing a polyfunctional amine monomer with a polyfunctional acyl halide monomer, (wherein each term is intended to refer both to the use of a single species or multiple species), on at least one surface of a porous support. As used herein, the term "polyamide" refers to a polymer in which amide linkages (—C(O)NH—) occur along the molecular chain. The polyfunctional amine and polyfunctional acyl halide monomers are most commonly applied to the porous support by way of a coating step from solution, wherein the polyfunctional amine monomer is typically coated from a polar solution (e.g. aqueous-based) and the polyfunctional acyl halide from a non-polar (e.g. hydrocarbon) solution. Although the coating steps need not follow a specific order, the polyfunctional amine monomer is preferably first coated on the porous support followed by the polyfunctional acyl halide. Coating can be accomplished by spraying, film coating, rolling, or through the use of a dip tank among other coating techniques. Excess solution may be removed from the support by air knife, dryers, ovens and the like.

The polyfunctional amine monomer comprises at least two primary or secondary amino groups and may be aromatic (e.g., m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, and tris (2-diaminoethyl) amine). Examples of preferred polyfunctional amine monomers include primary amines having two or three amino groups, for example, m-phenylene diamine, and secondary aliphatic amines having two amino groups such as piperazine. One preferred polyfunctional amine is m-phenylene diamine (mPD). The polyfunctional amine monomer may be applied to the porous support as a polar solution. The polar solution may contain from about 0.1 to about 20 weight percent and more preferably from about 0.5 to about 6 weight percent polyfunctional amine monomer. Once coated on the porous support, excess solution may be optionally removed.

The polyfunctional acyl halide monomer comprises at least two acyl halide groups and is preferably coated from a polar solvent although the polyfunctional acyl halide may be delivered from a vapor phase (e.g., for polyfunctional acyl halides having sufficient vapor pressure). The polyfunctional acyl halide is not particularly limited and aromatic or alicyclic polyfunctional acyl halides can be used along with combinations thereof. Non-limiting examples of aromatic polyfunctional acyl halides include: trimesic acid chloride, terephthalic acid chloride, isophthalic acid chloride, biphenyl dicarboxylic acid chloride, and naphthalene dicarboxylic acid dichloride. Non-limiting examples of alicyclic polyfunctional acyl halides include: cyclopropane tri carboxylic acid chloride, cyclobutane tetra carboxylic acid chloride, cyclopentane tri carboxylic acid chloride, cyclopentane tetra carboxylic acid chloride, cyclohexane tri carboxylic acid chloride, tetrahydrofuran tetra carboxylic acid chloride, cyclopentane dicarboxylic acid chloride, cyclobutane dicarboxylic acid chloride, cyclohexane dicarboxylic acid chloride, and tetrahydrofuran dicarboxylic acid chloride. One preferred polyfunctional acyl halide is trimesoyl chloride (TMC).

The polyfunctional acyl halide may be dissolved in a non-polar solvent in a range from about 0.01 to 10 weight percent, preferably 0.05 to 3 weight percent and may be delivered as part of a continuous coating operation. Suitable hydrocarbon solvents are those which are capable of dissolving the polyfunctional acyl halide and which are immiscible with water, e.g. the solvent preferably has a water solubility of less than 800 ppm (and more preferably less than 500, 400, 300, or 200, or in some embodiments, less than 150 ppm). As used herein, the term "water solubility" refers to the concentration of water that is soluble in a chosen non-polar solvent measured at 20° C. (101 kPa) as measured by ASTM D4928-11. The selection of non-polar solvent is not particularly limited and combinations of multiple solvents may be used. The solvent is preferably a liquid at 20° C. (101 kPa).

Non-limiting examples of applicable solvents include: paraffins (e.g. hexane, cyclohexane, heptane, octane, dodecane), isoparaffins (e.g. ISOPART™ L), aromatics (e.g. benzene, 1,3,5-trimethylbenzene, toluene,) and halogenated hydrocarbons (e.g. FREON™ series, chlorobenzene, di- and tri-chlorobenzene).

Once brought into contact with one another, the polyfunctional acyl halide and polyfunctional amine monomers react at their surface interface to form a polyamide layer or film. This layer, often referred to as a polyamide "discriminating layer" or "thin film layer," provides the composite membrane with its principal means for separating solute (e.g. salts) from solvent (e.g. aqueous feed).

The reaction time of the polyfunctional acyl halide and the polyfunctional amine monomer may be less than one second but contact times typically range from about 1 to 60 seconds, after which excess liquid may be optionally removed by way of an air knife, water bath(s), dryer or the like. The removal of the excess solvent can be achieved by drying at elevated temperatures, e.g. from about 40° C. to about 120° C., although air drying at ambient temperatures may be used.

The method is characterized by the step of applying a non-polar solution including an aliphatic acyclic tertiary amine compound to the support. The selection of solvent used to prepare the non-polar solution is not particularly limited and includes the same solvents described in connection with the non-polar solution used to apply the polyfunctional acyl halide monomer previously described. The non-polar solution preferably comprises from 0.01 to 50 mMol/L of the aliphatic, acyclic, tertiary amine compound. The step of applying the non-polar solution containing the tertiary amine compound to the porous support may be performed before, during or after the step of interfacially polymerizing the thin film polyamide layer. For example, in one preferred embodiment, the step of applying the non-polar solution including the aliphatic acyclic tertiary amine compound is performed after the formation of the thin film polyamide layer, (in which case the concentration is preferably from 5 to 25 mMol/L). In another preferred embodiment, the step of applying the aliphatic acyclic tertiary amine compound includes combining the aliphatic acyclic tertiary amine compound to the non-polar solution that also includes the polyfunctional acyl halide monomer and applying both the polyfunctional acyl halide monomer and aliphatic acyclic tertiary amine compound from a single non-polar solution (in which case the concentration is preferably from 0.25 to 5 mMol/L).

The aliphatic acyclic tertiary amine compound includes at least one amino group. In this context, the term "aliphatic amine" means that the amino group is not directly bonded to an aromatic group, (e.g. with reference to a benzene ring, a phenyl position would not be deemed "aliphatic" whereas a benzyl position would be "aliphatic"). The term "acyclic amine" means that no amino group is present within a ring structure; however, the amine compound may include one or more rings including alicyclic and aromatic rings which may be substituted or unsubstituted. While the amine compound may include a plurality of amino groups, all are preferably tertiary and none are cyclic. In a preferred embodiment, the subject amine compound includes a single nitrogen atom. A preferred class of amines is represented by Formula I.

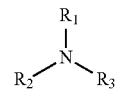

Formula I wherein $R_1$, $R_2$ and $R_3$ are independently selected from hydrocarbyl groups comprising from 1 to 20 carbon atoms; and more preferably aliphatic and aromatic groups comprising from 1 to 12 carbon atoms; and still more preferably, alkyl groups comprising from 1 to 12 carbon atoms. In another embodiment, $R_1$, $R_2$ and $R_3$ collectively comprise at least 4 carbon atoms and more preferably at least 6 carbon atoms. Representative species are described below in Table I. The subject amines are believed to form a quaternary amide with acyl halide groups. A proposed reaction pathway is provided below wherein trimesoyl chloride reacts with N,N-dimethyloctan-1-amine.

Proposed Reaction Pathway:

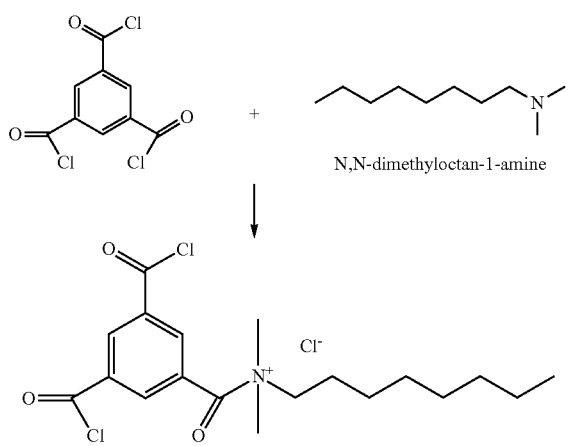

While not limited to a particular type of polyamide membrane, the subject invention is particularly suited for application to composite membranes such as those commonly used in RO and NF applications, and more particularly to flat sheet composite polyamide membranes used in RO and NF applications. The thin film polyamide layer may optionally include hygroscopic polymers upon at least a portion of its surface. Such polymers include polymeric surfactants, polyacrylic acid, polyvinyl acetate, polyalkylene oxide compounds, poly (oxazoline) compounds, polyacrylamides and related reaction products as generally described in U.S. Pat. No. 6,280,853; U.S. Pat. No. 7,815,987; U.S. Pat. No. 7,918,349; U.S. Pat. No. 7,905,361 and U.S. 2011/0220569. In some embodiments, such polymers may be blended and/or reacted and may be coated or otherwise applied to the polyamide membrane from a common solution, or applied sequentially.

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention. It will be understood that the various coating operations may be combined or bifurcated in to separated steps, e.g. the poly functional acyl halide and carboxylic acid compound may be coated from a common coating solution, from separate solutions, or from multiple coating solutions including various ratios of each.

EXAMPLES

Example 1

Application of Aliphatic Acyclic Tertiary Amine with a Polyfunctional Acyl Halide Sample membranes were hand cast on polysulfone supports that were cut into pieces (11 inch X 7 inch), attached to wire frames (10 inch×7.5 inch) and dipped in deionized water for at approximately 30 minutes and then immersed in an aqueous 3% w/v m-phenylenediamine (mPD) solution for at least another 20 minutes. The mPD soaked support was placed on a paper towel on top of a plastic sheet and excess solution was nipped off by rolling a rubber roller on the support. Then a silicone rubber gasket and a plastic sheet with the same opening size as the gasket were placed on the support and clamped on four sides to make a leak proof seal at the edges. A non-polar solution was prepared comprising trimesoyl chloride (TMC) and aliphatic acyclic tertiary amine compound within Isopar L so that the final concentration of TMC was 0.13% w/v and the concentration of tertiary amine was from 0.5 to 1.5 mmol/L (as designated below in Tables I and II). 60mL of the non-polar solution was then quickly poured upon the mPD soaked support and allowed to react for 1 minute. The residual non-polar solution was then poured off; the membrane was rinsed with 80 mL hexane and then was air-dried for 1 minute and stored in RO water before testing. From each sample membrane, 2-3 coupons were cut and tested in the 14 flat cell test bench using an aqueous salt solution (2000 ppm NaCl) at 225 psi, pH 8 and 25° C. along with control membranes made according to the same protocol but without the subject aliphatic acyclic tertiary amine. Changes in flux values as compared with controls are reported in Tables I and II.

TABLE I

Representative aliphatic, acyclic tertiary amines for use in the present invention.

| Ex. No. | Amine (mMol/L) | Chemical Structure | % Change in Flux |
|---|---|---|---|
| 1 | N,N-dimethylhexylamine (1.5) | | +40% |
| 2 | N,N-dimethyloctan-1-amine (0.5) | | +151% |
| 3 | N,N-dimethyldodecylamine (0.5) | | +64% |

TABLE I-continued

Representative aliphatic, acyclic tertiary amines for use in the present invention.

| Ex. No. | Amine (mMol/L) | Chemical Structure | % Change in Flux |
|---|---|---|---|
| 4 | Triisobutylamine (1.5) | | +8% |
| 5 | N,N,N'N'-tetramethyl-1,6-hexanediamine (1.5) | | +1% |
| 6 | N,N,N',N'',N''-pentamethyldiethylenetriamine (1.5) | | +16% |

TABLE II

Representative amines not forming part of the present invention.

| Ex. No. | Amine (mMol/L) | Chemical Structure | % Change in Flux |
|---|---|---|---|
| 7 | N-heptyloctan-1-amine (0.5) | | −76% |
| 8 | octan-1-amine (0.5) | | −45% |
| 9 | 1,1,3,3-tetramethylguanidine (0.5) | | −6% |
| 10 | Piperidine (1.5) | | −8% |
| 11 | N-methylpiperidine (1.5) | | −4% |
| 12 | 1-(2-methylbenzyl)piperazine (0.5) | | −24% |
| 13 | 1,8-Diazabicyclo[5.4.0]undec-7-ene (0.5) | | −0.5% |

TABLE II-continued

Representative amines not forming part of the present invention.

| Ex. No. | Amine (mMol/L) | Chemical Structure | % Change in Flux |
|---|---|---|---|
| 14 | 1,4-dimethylpiperazine (1.5) | | −19% |
| 15 | pyrazine (1.5) | | 0% |
| 16 | pyrimidine (1.5) | | −6% |
| 17 | 2-methyl-1-pyrroline (1.5) | | −33% |
| 18 | 4-methylmorpholine (1.5) | | −30% |

Example 2

Post-Coating of Non-Polar Solution of Aliphatic Acyclic Tertiary Amine (N,N-Dimethyl Octyl Amine) "DMOA"

All sample membranes were produced using pilot scale membrane manufacturing line. Polysulfone supports were casts from 16.5 wt. % solutions in DMF and subsequently soaked with an aqueous solution of meta-phenylene diamine (mPD). The resulting support was then pulled through a reaction table at constant speed while a thin, uniform layer of a non-polar solution including isoparaffinic (ISOPAR L), trimesoyl acid chloride (TMC) and from 0.13% to 0.17% w/v of tributyl phosphate (TBP) was applied. Excess non-polar solution was removed and then a second layer of non-polar solution containing Isopar L and an aliphatic acyclic tertiary amine was applied on the membrane surface. Excess non-polar solution was removed and the resulting composite membrane was passed through water rinse tanks and drying ovens. The sample membranes were then subject to testing using a 2000 ppm NaCl aqueous solution at 150 psi, pH 8 and at room temperature. The testing results are summarized in Table III.

TABLE III

| mPD (% w/v) | TMC (% w/v) | DMOA (20 mMol/L) | Avg Flux (GFD) | Avg NaCl Passage (%) | Std Dev (Avg Flux) | Std Dev (Avg NaCl SP) |
|---|---|---|---|---|---|---|
| 3.1 | 0.13 | no | 36.4 | 0.57 | 1.19 | 0.06% |
| 3.1 | 0.13 | yes | 41.5 | 0.66 | 0.35 | 0.01% |
| 3.1 | 0.17 | no | 40.4 | 0.52 | 0.52 | 0.03% |
| 3.1 | 0.17 | yes | 45.8 | 0.78 | 0.59 | 0.06% |
| 4.3 | 0.13 | no | 24.9 | 0.44 | 0.59 | 0.01% |
| 4.3 | 0.13 | yes | 28.2 | 0.49 | | |
| 4.3 | 0.17 | no | 28.7 | 0.36 | 0.11 | 0.02% |
| 4.3 | 0.17 | yes | 33.6 | 0.51 | | |

Example 3

Post-Coating of Non-Polar Solution of Aliphatic Acyclic Tertiary Amine (DMOA) with Isopar Phase for Piperazine Chemistry (NF membranes)

Sample membranes were produced according to the methodology described in connection with Example 2 except that mPD was replaced with piperazine and dimethyl piperazine, and TBP was not included in the non-polar coating solution. The sample membranes were subject to the testing using an aqueous solution comprising 2000 ppm $MgSO_4$ at 70 psi, pH 6 and room temperature. The results are summarized in Table IV.

TABLE IV

| Piperazine (w/v %) | Dimethyl piperazine (w/v %) | TMC (w/v %) | DMOA (20 mMol/L) | Flux (GFD) | MgSO$_4$ passage (%) | A value (GFD/psi) | B value (GFD) |
|---|---|---|---|---|---|---|---|
| 3.5 | 3.5 | 0.2 | no | 7 | 0.33% | 0.112 | 0.023 |
| 3.5 | 3.5 | 0.2 | yes | 16.1 | 1.75% | 0.257 | 0.287 |
| 4.5 | 4.5 | 0.25 | no | 8.7 | 0.31% | 0.139 | 0.027 |
| 4.5 | 4.5 | 0.25 | yes | 14 | 1.17% | 0.223 | 0.166 |
| 4.5 | 4.5 | 0.2 | no | 10 | 0.31% | 0.163 | 0.031 |
| 4.5 | 4.5 | 0.2 | yes | 15 | 1.02% | 0.239 | 0.155 |

The invention claimed is:

1. A method for making a composite polyamide membrane comprising a porous support and a thin film polyamide layer, wherein the method comprises the step of applying a polar solution comprising a polyfunctional amine monomer and non-polar solution comprising a polyfunctional acyl halide monomer to a surface of the porous support and interfacially polymerizing the monomers to form a thin film polyamide layer, wherein the method is characterized by the step of applying a non-polar solution comprising an aliphatic acyclic tertiary amine compound to the support, wherein the aliphatic acyclic tertiary amine compound is represented by Formula I:

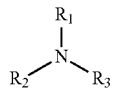

wherein $R_1$, $R_2$ and $R_3$ are independently selected from hydrocarbyl groups comprising from 1 to 20 carbon atoms.

2. The method of claim 1 wherein the step of applying the non-polar solution comprising an aliphatic acyclic tertiary amine compound is performed after the formation of the thin film polyamide layer.

3. The method of claim 1 wherein the step of applying the non-polar solution comprising an aliphatic acyclic tertiary amine compound comprises adding the aliphatic acyclic tertiary amine compound to the non-polar solution that comprises the polyfunctional acyl halide monomer and applying both the polyfunctional acyl halide monomer and aliphatic acyclic tertiary amine compound from a single non-polar solution.

4. The method of claim 1 wherein the concentration of the aliphatic acyclic tertiary amine compound is from 0.01 to 50 mMol/L.

5. The method of claim 1 wherein the aliphatic acyclic tertiary amine compound comprises a single nitrogen atom.

6. The method of claim 1 wherein $R_1$, $R_2$ and $R_3$ are independently selected from aliphatic comprising from 1 to 12 carbon atoms.

7. The method of claim 1 wherein $R_1$, $R_2$ and $R_3$ are independently selected from alkyl groups comprising from 1 to 12 carbon atoms.

8. The method of claim 1 wherein $R_1$, $R_2$ and $R_3$ collectively comprise at least 4 carbon atoms.

9. The method of claim 1 wherein $R_1$, $R_2$ and $R_3$ collectively comprise at least 6 carbon atoms.

* * * * *